United States Patent [19]

Stockbridge

[11] 3,825,109
[45] July 23, 1974

[54] ACCUMULATING LIFT-AND-CARRY CONVEYOR

[75] Inventor: John M. Stockbridge, Flint, Mich.

[73] Assignee: General Motors Corporation, Detroit, Mich.

[22] Filed: June 25, 1973

[21] Appl. No.: 373,186

[52] U.S. Cl. .................................. 198/219, 198/218
[51] Int. Cl. ............................................ B65g 25/04
[58] Field of Search ........................ 198/219, 218, 221

[56] References Cited
UNITED STATES PATENTS

| | | | |
|---|---|---|---|
| 3,545,600 | 12/1970 | Rudlaff | 198/219 |
| 3,552,543 | 1/1971 | Manetta | 198/219 |
| 3,687,275 | 8/1972 | Braser | 198/219 |

Primary Examiner—Richard A. Schacher
Assistant Examiner—Richard K. Thomson
Attorney, Agent, or Firm—Edward J. Biskup

[57] ABSTRACT

An accumulating lift and carry conveyor for moving individual parts along the longitudinal axis of the conveyor. The conveyor includes a pair of laterally spaced side plates having a series of transversely aligned stations formed in the upper portions of the side plates for supporting and spacing the parts. A lifter member having a plurality of carrier members is located between the side plates and is adapted to be driven in a closed circular path about an axis extending transversely to the longitudinal axis of the conveyor. The side plates carry a plurality of actuator members which cooperate with the carrier members for moving the latter to appropriate positions so as to cause the individual parts to be moved from one station to the next or to remain in the accommodating stations depending upon whether one or more of the stations is unoccupied.

3 Claims, 17 Drawing Figures

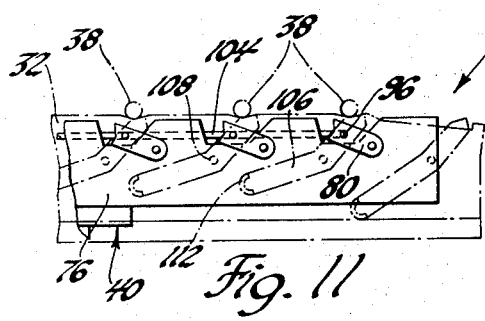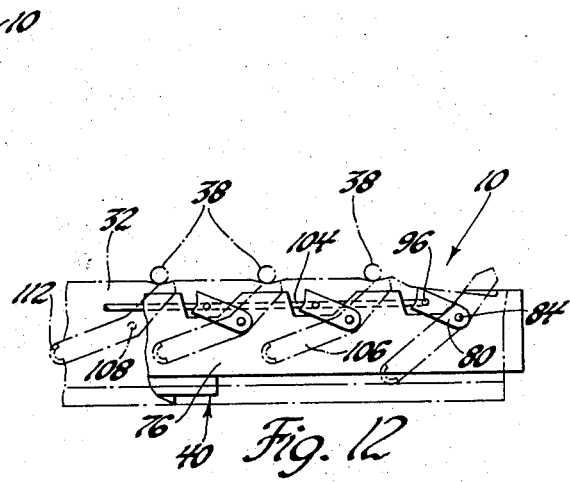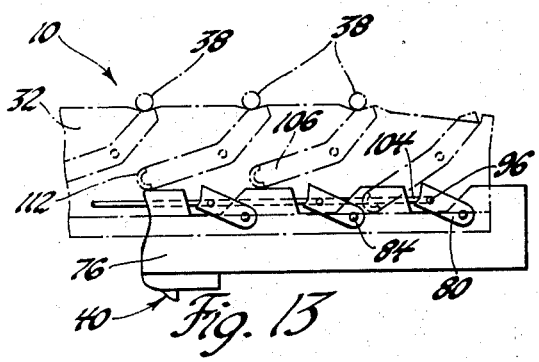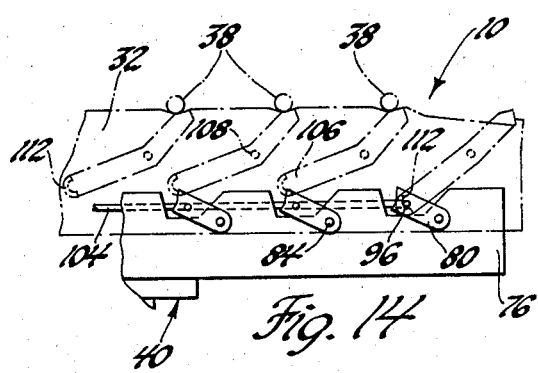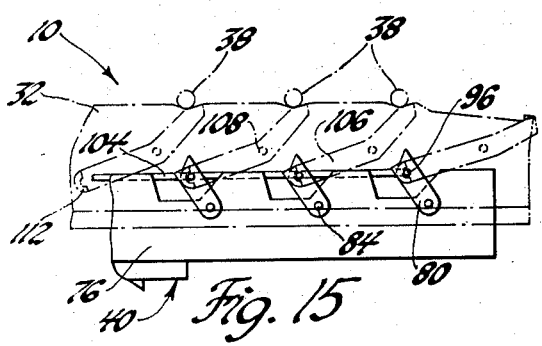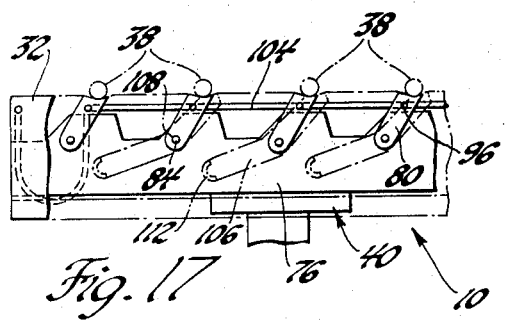

ACCUMULATING LIFT-AND-CARRY CONVEYOR

The present invention concerns a conveyor system and more particularly an accumulating lift and carry conveyor which serves to transport parts from one end of the conveyor to the other along the longitudinal axis of the conveyor. This is accomplished by providing a conveyor which is adapted to move parts individually so that no part-to-part contact occurs therebetween and also permits the parts to automatically accumulate when there is no room ahead so that, in effect, the parts remain stationary awaiting transfer to the next station upon removal of the succeeding part.

In the preferred form the accumulating lift and carry conveyor made according to the invention comprises a pair of laterally spaced side plates which are formed with a series of transversely aligned stations for supporting and uniformly spacing individual parts along the longitudinal axis of the conveyor. A lifter member is positioned between the side plates and serves to carry a plurality of carrier members each of which is pivotally connected to the lifter member and is movable between a first position wherein the carrier member is inclined towards one end of the conveyor and a second position wherein the carrier member is inclined towards the other end of the conveyor. While in the first position, the carrier member is operative to cause movement of parts from one station to the next, but when in the second position the carrier member is unable to do so. Each adjacent pair of carrier members are interconnected through flexible means so that upon movement of one carrier member to the first position, all preceding carrier members experience a similar movement. The lifter member is supported for movement in a closed circular path about an axis extending transversely to the longitudinal axis of the conveyor so when the carrier members are in the first position, they serve to raise and move each part from one station to the next, but when the carrier members are in the second position, the parts remain in their respective positions without any movement. In order to provide shifting movement of the carrier members between the aforementioned positions, a plurality of actuator members are provided which are pivotally mounted to one of the side plates. Each of the actuator members take the form of a lever and has a lower end which is adapted to move the carrier members from the second position to the first position whenever the upper end of the actuator member extends into an empty station.

The objects of the present invention are to provide a conveyor which will move parts individually from one end of the conveyor to the other and serves to automatically maintain parts in their respective stations until one or more parts are removed from the conveyor; to provide a conveyor system for spacing and moving individual parts along the longitudinal axis of the conveyor with lever means being provided for determining when such movement should occur; to provide a lift and carry conveyor which includes a plurality of pivoted carrier members which are positioned in an operative or inoperative position as they move in a closed circular path by an actuator member supported along side each carrier member; to provide a conveyor which includes a pair of pivoted lever members one of which serves to lift and carry parts from one station to the next while the other serves to properly position the first lever member depending upon whether or not the succeeding station is occupied; and to provide a conveyor having a series of carrier members for transporting parts from one station to another and that have a reclining inoperative position as they travel in a closed circular path and are automatically raised to an operative position by a pivoted actuator member whenever a part is removed from the conveyor.

Other objects and advantages of the present invention will be more apparent from the following detailed description when taken with the drawings in which:

FIGS. 4 through 17 show the progressive movements of the various parts of the conveyor as the latter is operated through one complete cycle.

Figure 1:
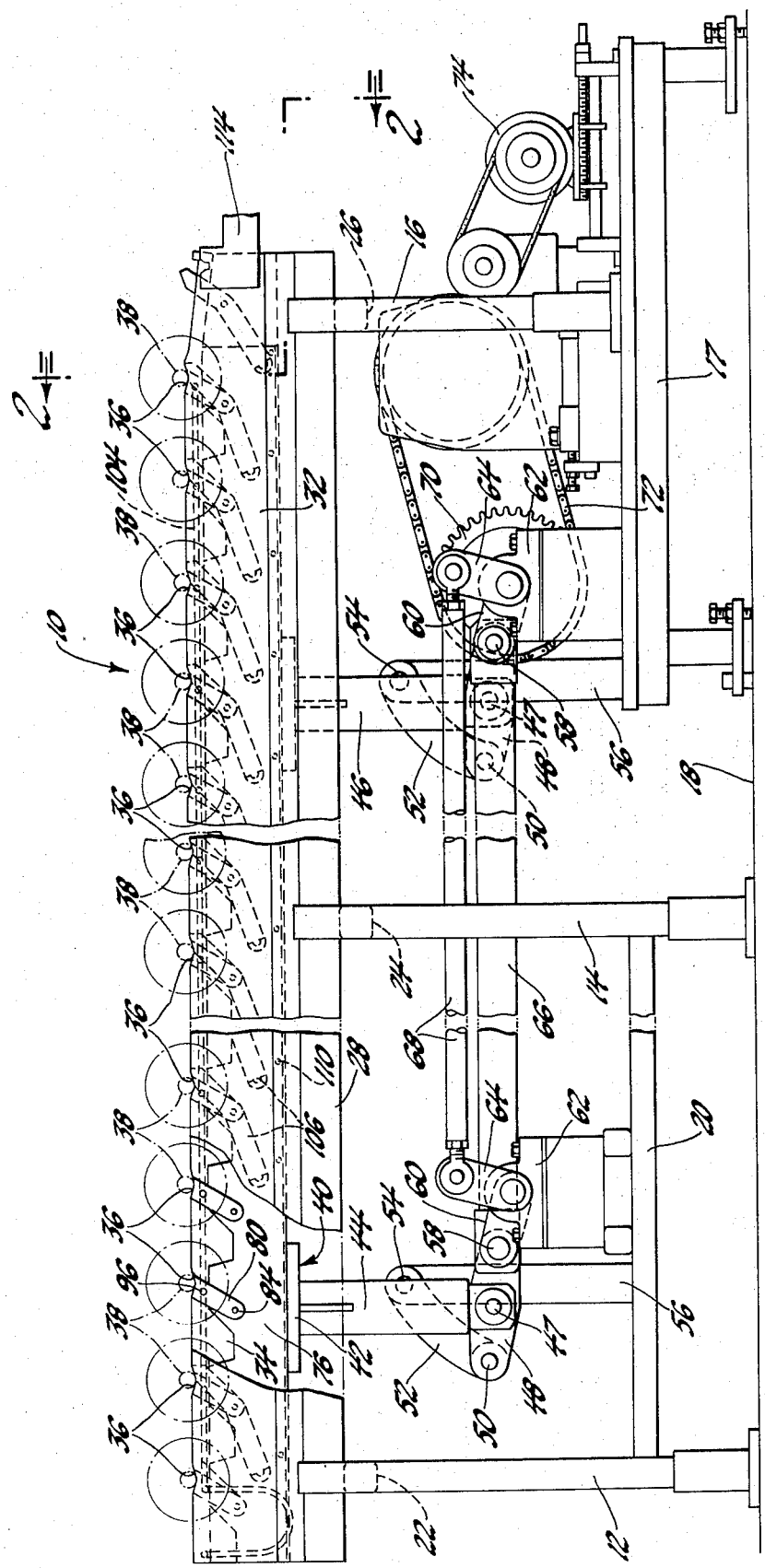
FIG. 1 is an elevational view showing an accumulating lift and carry conveyor made according to the invention.
Figure 2:
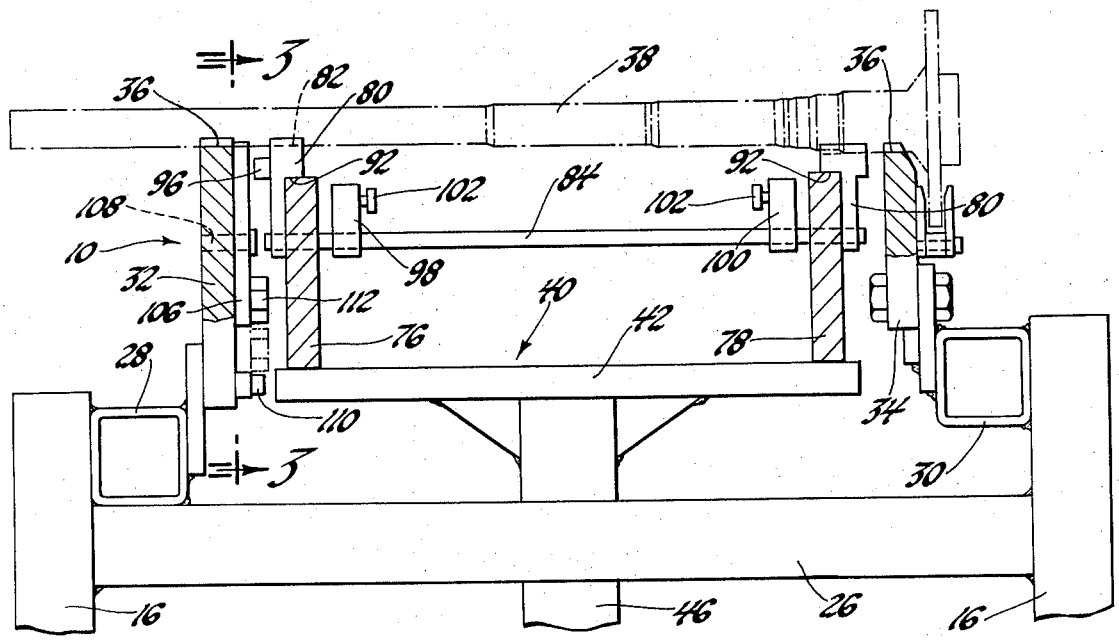
FIG. 2 is an enlarged view taken on lines 2—2 of FIG. 1.

Referring to the drawings and more particularly FIGS. 1 and 2 thereof an accumulating lift-and-carry conveyor 10 made according to the invention is shown which comprises a supporting frame consisting of a plurality of parallel and transversely paired upright members 12, 14, and 16 the lower ends of which are supported either directly or through another support such as the table 17 on a flat floor 18. Each pair of upright members 12 and 14 are interconnected by a longitudinally extending rail 20 and by cross members 22 and 24. Similarly, the transversely spaced members 16 are interconnected by a cross bar 26 and the upper ends of all the members 12, 14, and 16 are interconnected by upper rails 28 and 30 so as to provide rigid bases which serve to support a drive mechanism and the various parts which constitute the conveying portion of the conveyor.

More specifically and as seen in FIG. 2, it will be noted that the upper rails 28 and 30 of the frame rigidly carry longitudinally extending side plates 32 and 34 respectively which are transversely spaced and located in parallel vertical planes. The upper ends of the side plates 32 and 34 are formed with transversely aligned notches 36 which are uniformly spaced along the longitudinal axis of the conveyor and serve as stations for accommodating parts to be transferred such as the cylindrical parts 38 shown in the drawings. Located between the side plates 32 and 34 is a lifter member 40 which comprises a flat horizontal base plate 42 the lower surface of which is fixed with and carried by a pair of longitudinally spaced and vertically extending arms 44 and 46 as best seen in FIG. 1. The lower end of each of the arms 44 and 46 is connected by a pivotal connection 47 to an intermediate portion of a link member 48 one end of which is connected by a pivotal connection 50 to a lever 52, which in turn, is connected by a pivotal connection 54 to a pedestal 56 rigidly carried by the frame of the conveyor. The opposite end of the link member 48 is connected by a pivotal connection 58 to one arm 60 of a crank which is journaled within a bearing 62 for rotation about a transversely extending horizontal axis. The crank has another arm 64 which is located 90° out of phase with the arm 60 and longitudinally extending rod members 66 and 68 respectively serve to pivotally interconnect the arms 60 and the arms 64 of the two cranks. It will be noted that one of the cranks is fixed with a sprocket wheel 70 which is driven through a chain 72 and suitable gearing by an electric drive system including an electric motor 74. Thus, when the sprocket wheel 70 is driven in a clockwise direction as seen in FIG. 1, the interconnected cranks will rotate in a similar direction and through the linkage provided by lever 52 and link member 48 causing the lifter member and any point selected thereon to travel in the closed eliptical path shown in FIG. 3.

Figure 3:
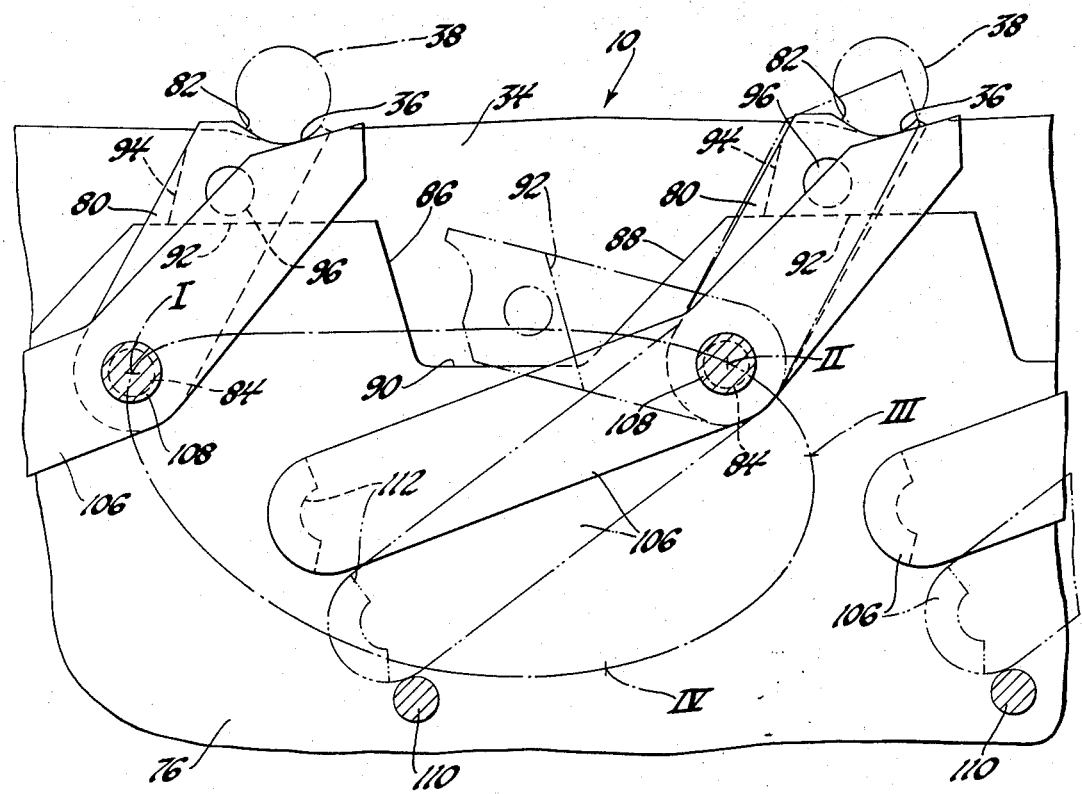
FIG. 3 is an enlarged view taken on lines 3—3 of FIG. 2 showing the construction of the carrier members and the actuator members which are incorporated with the conveyor.
Figure 7:
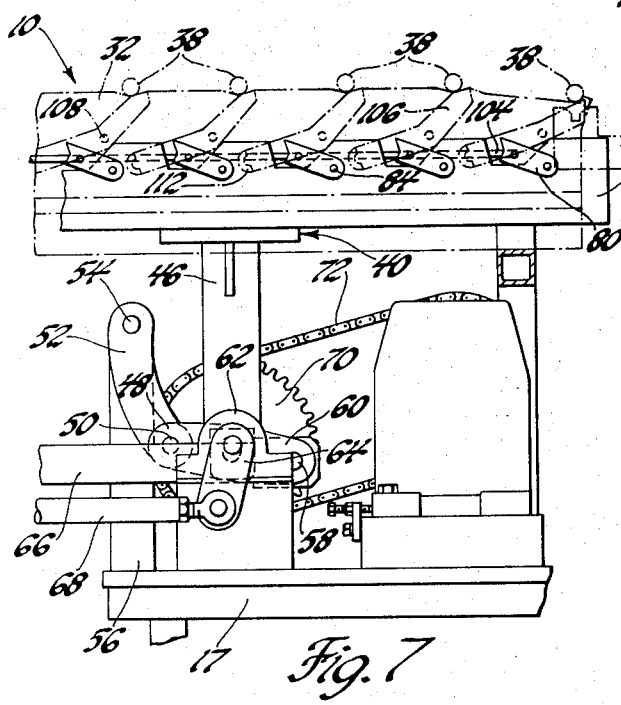

As seen in FIG. 2, the upper surface of the base plate 42 serves to rigidly support a pair of laterally spaced vertical side walls 76 and 78. Each of the side walls 76 and 78 supports a plurality of carrier members 80 which as seen in FIG. 3 have an upper end formed with a curved surface 82 and a lower end which is rigidly connected with a transversely extending pivot shaft 84 carried by the side walls 76 and 78. The carrier members 80 are identically formed and uniformly spaced along the longitudinal axis of the conveyor a distance substantially equal to the distance between the notches 36. In addition, pivot shaft 84 is located in a horizontal plane and provides a transverse pivot axis about which the carrier member can rotate. In this regard and as seen in FIGS. 1 and 3, it will be noted that each side wall 76 and 78 is formed with a cut-out portion adjacent each carrier member 80. Each cut-out portion is defined by inclined side walls 86, 88 and a base wall 90. The upper end of each carrier member 80 has a stop portion integrally formed therewith which extends inwardly. The stop portion has a base edge 92 which serves to contact the upper surface of the associated side wall so as to position each carrier member 80 in the inclined position shown in full lines FIG. 3. The stop portion also has a side edge 94 which serves as a stop when the carrier member 80 moves in a counterclockwise direction about its pivotal connection into the phantom-line position shown in FIGS. 3 and 7. In this position, the side edge 94 contacts the base wall 90 of the cut-out portion. As aforementioned, the carrier members 80 located on the side walls are similar in design, however, it will be noted the carrier members provided on side wall 76 have a pin 96 which extends laterally outwardly from the carrier member as shown in FIG. 2. Also, the shaft 84 which extends transversely between the carrier members rigidly carries a pair of laterally spaced members 98 and 100 each of which is provided with an inwardly extending pin 102. The pins 102 of longitudinally aligned members are interconnected by a chain 104 as seen in FIG. 1, the left end of which is anchored to a fixed point of the conveyor frame. Thus, it should be apparent that with the chain arrangement as explained above, movement of any carrier member 80 from the upright or operative position shown in FIG. 3 to the lowered or inoperative position, results in all succeeding carrier members being similarly moved.

As seen in FIGS. 1, 2 and 3, the side plate 32 serves to carry a plurality of actuator members 106 each of which is formed as a lever having an upper end and a lower end with an intermediate portion thereof mounted to the side plate 32 by a pivotal connection 108. In this regard and as seen in FIG. 3, in one position of the lifter member 40, each actuating member 106 has the pivotal connection thereof located coaxially with the pivot shaft 84 of the carrier members 80. A series of the actuator members 106 are provided along the side plate 32 with each actuator member being located adjacent to a notch 36 with the upper end of the actuator member adapted to move into the phantom-line position of FIG. 3, wherein the upper end is located above the notch, whenever a part 38 is not located in the notch. When a part 38 is in the associated notch, the upper end of the actuator member 106 is depressed downwardly so as to cause the actuating member 106 to rotate in a clockwise direction about its pivotal connection 108 causing the lower end to be raised. As seen in FIG. 2, a pin 110 is secured to the side plate below and actuator member 106 and serves as a stop for limiting counterclockwise rotation thereof whenever the associated notch is unoccupied. Accordingly, it should be understood that the actuator member 106 has two positions, one of which is shown in phantom-lines while the other is shown in full lines in FIG. 3. It will also be noted that the lower end of the actuator member 106 is formed with a tab member 112 having arcuate depression that serves as a pocket. The function of the pocket will be more apparent from the description of the operation of the conveyor which now follows:

The accumulating lift-and-carry conveyor 10 described above operates as follows:

With reference to FIG. 1, it will be noted that all of the notches or stations 36 except the last station are filled with parts 38 that are to be conveyed in a rightwardly direction. In addition, it will be noted that an arm 114 of a transfer device is shown located adjacent the last station and is adapted to remove a part 38 from the last station in sequenced operation with the lift-and-carry conveyor 10. Although not shown, the transfer device includes an appropriate mechanism which causes the arm 114 to be raised in a vertical direction to remove a part 38 from the last notch and subsequently, the arm 114 moves towards the right to place the part 38 in a press for a machining operation or it may serve to transfer the part to another location. It will also be noted that as seen in FIG. 1, all of the carrier members 80 are located in the upright or operative position and that the driving mechanism has the pivot shaft 84 of each of the carrier members 80 positioned at a point indicated by the Roman numeral I in the path of travel as shown in FIG. 3.

Figure 5:
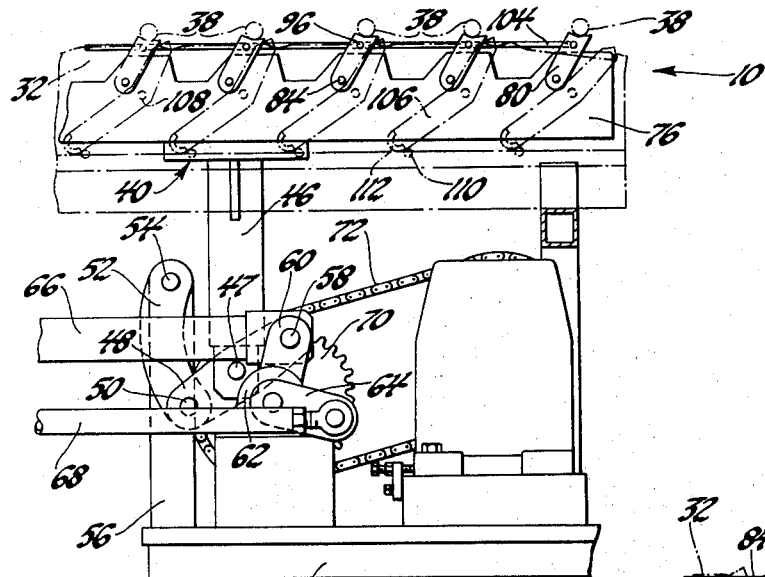
Figure 4:
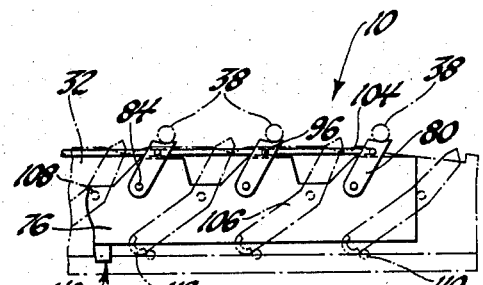
Figure 6:
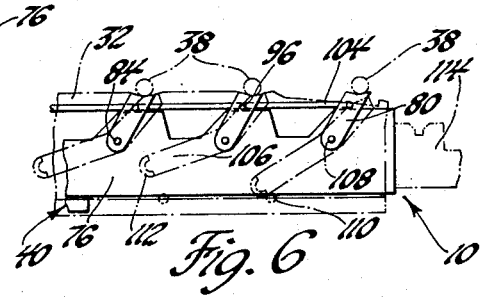
Figure 8:
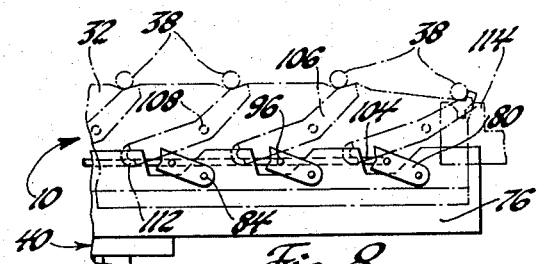
Figure 10:
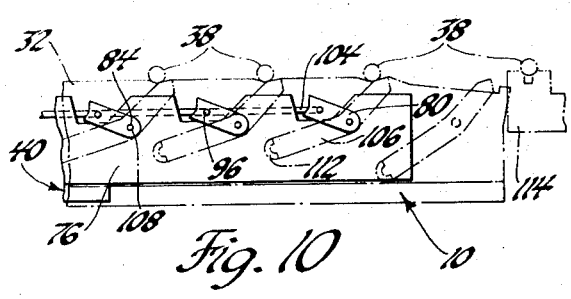
Figure 9:
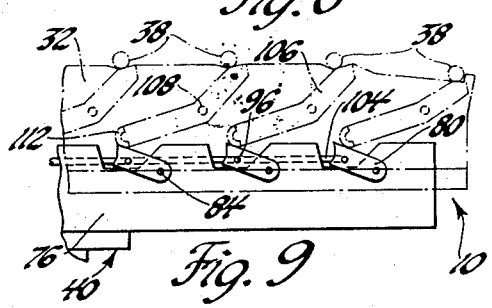

As the sprocket wheel now rotates in a clockwise direction from the position shown in FIG. 1 to a position wherein each arm 60 is rotated approximately 90°, the lifter member 40 is raised and accordingly carrier members 80 initially have the upper ends thereof raised above the top surface of the side plates 32 and 34 causing the parts 38 to be lifted from the side plates 32 and 34 by the curved surface 82 of the carrier member and carried therealong to the next station as seen in FIGS. 4, 5, and 6. During such movement the pivot shaft 84 of each carrier member 80 travels along the path shown in FIG. 3 from the position indicated by Roman numeral I to the position indicated by Roman numeral II. As the crank continues to rotate in a clockwise direction to the FIG. 7 position, the center of the pivot shaft 84 of carrier member 80 moves to the position indicated by Roman numeral III on the FIG. 3 curve, at which time, the anchored chain 104 at the left end of the conveyor is drawn taunt so as to cause all the carrier members 80 to rotate in a counterclockwise direction about the pivot shaft 84 into the phantom-line position shown in FIG. 3 and the full line position of FIG. 7. As each of the carrier members 80 proceeds along the lower position of the path shown in FIG. 3 from the position indicated by Roman numeral III to the position indicated by Roman numeral IV, the pin 96 formed with each carrier member 80 passes below the lower end of each of the actuator members 106 from the FIG. 8 position to the position of FIG. 9. The carrier members 80 then proceed from the FIG. 9 position to that shown in FIG. 10 at which time the axis of the pivot shaft 84 has returned to and is located at the starting position indicated by Roman numeral I along the path shown in FIG. 3. At this point, the last part 38 is removed from the conveyor by the arm 114 causing the last actuator member 106 to move in a counterclockwise direction so that the lower end thereof moves to the phantom-line position shown in FIG. 3. The lifter member 40 then starts a new cycle beginning again with the position indicated by Roman numeral I in FIG. 3, but in this instance, each of the carrier members 80 are in the inoperative or rearwardly inclined position and consequently move beneath the parts 38 located in the stations of the conveyor to the position shown in FIG. 11 and then to that shown in FIG. 12 and finally the position shown in FIG. 13. As the carrier members 80 move from the Roman numeral III position towards Roman numeral IV position along the curve shown in FIG. 3, the pin 96 is intercepted by the pocket 112 formed in the lower end of the actuator member 106 as shown in FIG. 14. Continued movement of the carrier members 80 towards the Roman numeral I position then causes the carrier members 80 to be raised to the upright position as seen in FIGS. 15 and 16 so that the carrier members 80 are then in the same position as shown in FIG. 1 and once again cause transfer of the parts in a manner as explained hereinbefore. It will be understood, that as the arm 114 removes a part 38 from the last station at the rightward end of the conveyor, the preceding parts 38 are moved as described above on a continuous basis.

Various changes and modifications can be made in this construction without departing from the spirit of the invention. Such changes and modifications are contemplated by the inventor and he does not wish to be limited except by the scope of the appended claims.

I claim:

1. An accumulating lift and carry conveyor for moving individual parts along the longitudinal axis of the conveyor, said conveyor comprising a pair of laterally spaced side plates, a series of transversely aligned stations formed in the upper portions of said side plates for supporting and uniformly spacing said individual parts along said longitudinal axis, a lifter member located between said side plates, a plurality of carrier members pivotally carried by said lifter member, each of said carrier members having an upper end and a lower end, means on the lifter member for limiting pivotal movement of each of said carrier members between a first position wherein said each of said carrier members is inclined towards one end of said conveyor and a second position wherein said each of said carrier members is inclined towards the other end of said conveyor, flexible means interconnecting adjacent pairs of said carrier members, drive means connected to said lifter member for moving the latter in a closed path about an axis extending transversely to said longitudinal axis so when the carrier members are in the first position the upper ends thereof serve to raise and move each part from its accommodating station to the next station but when the carrier members are in the second position they move below the parts without contacting the latter so that the parts maintain their positions in the accommodating stations, a plurality of actuators pivotally mounted to one of said side plates, each of said actuators having a lower end and an upper end the latter of which is adapted to extend into one of said stations and be depressed by a part when said upper end is located in the station, each of said actuators having means formed therewith for engaging said carrier member to cause the latter and all preceding carrier members to be moved from the second position to the first position whenever the upper end of the actuator extends into an unoccupied station so that all parts at stations preceding said unoccupied station are simultaneously moved by the carrier members to the next stations.

2. An accumulating lift and carry conveyor for moving individual parts along the longitudinal axis of the conveyor, said conveyor comprising a pair of laterally spaced side plates, a series of transversely aligned stations formed in the upper portions of said side plates for supporting and uniformly spacing said individual parts along said longitudinal axis, a lifter member located between said side plates, a plurality of carrier members located along each side plate, each carrier member having an upper end and a lower end, the lower ends of each pair of transversely aligned carrier members being rigidly supported by a transverse shaft which is pivotally carried by said lifter member, means on the lifter member and said carrier members for limiting pivotal movement of each of said carrier members between a first position wherein said each of said carrier members is inclined towards one end of said conveyor and a second position wherein said each of said carrier members is inclined towards the other end of said conveyor, flexible means interconnecting adjacent shafts of said carrier members, drive means connected to said lifter member for moving the latter in a closed path about an axis extending transversely to said longitudinal axis so when the carrier members are in the first position the upper ends thereof serve to raise and move each part from its accommodating station to the next station but when the carrier members are in the second position they move below the parts without contacting the latter so that the parts maintain their positions in the accommodating stations, a plurality of actuators pivotally mounted to one of said side plates, each of said actuators having a lower end and an upper end the latter of which is adapted to extend into one of said stations and be depressed by a part when said upper end is located in the station, each of said actuators having means formed therewith for engaging a portion of a carrier member to cause the latter and all preceding carrier members to be moved from the second position to the first position whenever the upper end of the actuator extends into an unoccupied station so that all parts at stations preceding said unoccupied station are simultaneously moved by the carrier members to the next stations.

3. An accumulating lift and carry conveyor for moving individual parts along the longitudinal axis of the conveyor, said conveyor comprising a pair of laterally spaced vertically oriented side plates, a series of transversely aligned notches formed in the upper portions of said side plates for supporting and uniformly spacing said individual parts along said longitudinal axis, a lifter member located between said side plates, a plurality of carrier members each having an upper end and a lower end, the lower end of each of said carrier members being pivotally supported by said lifter member for movement about a transverse axis, located below said notches, cooperating means on the lifter member and the carrier members for limiting pivotal movement of each of said carrier members between a first position wherein said each of said carrier members is inclined towards one end of said conveyor and a second position wherein said each of said carrier members is inclined towards the other end of said conveyor, flexible means interconnecting adjacent pairs of said carrier members, drive means connected to said lifter member for moving the latter in a closed elliptical path about an axis extending transversely to said longitudinal axis so when the carrier members are in the first position the upper ends thereof serve to raise and move each part from its accommodating notch to the next notch but when the carrier members are in the second position they move below the parts without contacting the latter so that the parts maintain their positions in the accommodating notches, a plurality of actuators pivotally mounted to one of said side plates, each of said actuators having a lower end and an upper end the latter of which is adapted to extend into one of said notches and be depressed by a part when said upper end is located in the notch, the lower end of each of said actuators having pocket means formed therewith for engaging a pin formed with a carrier member to cause the latter and all preceding carrier members to be moved from the second position to the first position whenever the upper end of the actuator extends into an unoccupied notch so that all parts at notches preceding said unoccupied notch are simultaneously moved by the carrier members to the next notch.

* * * * *